United States Patent [19]

Gebhard et al.

[11] Patent Number: 4,501,618

[45] Date of Patent: Feb. 26, 1985

[54] METHOD OF MAKING A BUILDING MATERIAL

[75] Inventors: Georg R. U. Gebhard, Reichshof; Klaus R. G. Hein, Bergheim-Ahe, both of Fed. Rep. of Germany

[73] Assignee: Rheinisch-Westfälisches Elektrizitätswerk Aktiengesellschaft, Essen, Fed. Rep. of Germany

[21] Appl. No.: 526,910

[22] Filed: Aug. 26, 1983

[30] Foreign Application Priority Data

Aug. 28, 1982 [DE]  Fed. Rep. of Germany ....... 3232078

[51] Int. Cl.³ .............................................. C04B 11/00
[52] U.S. Cl. ............................... 106/109; 106/DIG. 1
[58] Field of Search ......................... 106/109, DIG. 1; 423/242 A

[56] References Cited

U.S. PATENT DOCUMENTS

| | | | |
|---|---|---|---|
| 4,108,677 | 8/1978 | Valiga | 106/109 |
| 4,226,630 | 10/1980 | Styron | 106/DIG. 1 |
| 4,262,610 | 4/1981 | Hein et al. | 110/342 |
| 4,344,796 | 8/1982 | Minnick | 106/DIG. 1 |
| 4,354,876 | 10/1982 | Webster | 106/109 |

*Primary Examiner*—Helen M. McCarthy
*Attorney, Agent, or Firm*—Karl F. Ross; Herbert Dubno

[57] ABSTRACT

A building material consists essentially of an aqueous slurry of a dry residue obtained by treating a flue gas containing fly ash from a fossil fuel combustion chamber with a finely divided absorbent consisting at least primarily of calcium oxide, calcium hydroxide and calcium carbonate to permit reaction between the absorbent and sulfur dioxide in the flue gas, and dry separation of the reacted absorbent from the residual flue gas.

8 Claims, No Drawings

METHOD OF MAKING A BUILDING MATERIAL

CROSS REFERENCE TO RELATED APPLICATIONS

This application is related to the commonly assigned copending applications Ser. No. 526,903 based upon German application No. P 32 32 077.9; Ser. No. 526,886 based upon German application No. P 32 32 079.5; Ser. No. 526,904 based upon German application No. P 32 32 080.0; and Ser. No. 526,907 based upon German application No. P 32 32 081.7; all of these German applications having been filed Aug. 28, 1982 and all of the U.S. applications being filed concurrently herewith.

FIELD OF THE INVENTION

Our present invention relates to a method of making a building material and, more particularly, to the use of a solid residue recovered from the dry desulfurization of flue gases in a structural material.

BACKGROUND OF THE INVENTION

In the removal of sulfur dioxide and other toxic and noxious components from flue gases before they are subjected to reuse, to further treatment, or to discharge into the atmosphere, it is known to employ dry absorbents which interact with these components and form reaction products which are thereby eliminated upon the removal of particulates from the gas stream.

These particulates, after removal from the remainder of the flue gas, constitute a residue which must be disposed of.

Dry absorbents for the desulfurization of flue gases, especially the flue gases of boiler combustion chambers and power plant boilers in particular, can comprise calcium-containing compounds such as calcium oxide ($CaO$), calcium carbonate ($CaCO_3$) and the calcium hydroxide ($Ca[OH]_2$). These absorbents can be used alone or together with corresponding magnesium compounds.

The absorbent can either be introduced into the fuel so as to be entrained into the combustion chamber therewith and begin the reaction phase with the sulfur dioxide as it is formed or introduced into the flue gases in the combustion chamber or downstream thereof.

In the commonly assigned U.S. Pat. No. 4,262,610 (corresponding to German patent DO-PS No. 28 07 076) the absorbent is combined with the low-rank solid fuel by dry milling the two together.

The primary reaction product from the use of such absorbents is the calcium sulfate ($CaSO_4$) also known as anhydrite.

The product, together with other particulates, can be recovered in an electrostatic filter or by some other particle removal technique and the residue contains, apart from residual absorbent and its reaction products with the toxic or noxious components of the flue gas (e.g. anhydrite), substantial quantities of fly ash. Depending upon the sulfur content of the flue gas, the fly ash proportion can be between 15 and 60% by weight and generally is about 40% of the residue. The fly ash content can vary significantly especially when the fuel is a low-rank coal such as brown coal and complicates the process since it is desirable to keep the anhydrite concentration in the residue constant over long periods of time to permit effective use of the residue.

The residue can be stored at a dump site, especially if the anhydrite concentration varies, to allow the accumulation of large quantities, and blended where a varying composition is involved. Not only does this require considerable space but it also creates an environmental hazard since leaching from the residue is possible under ambient conditions.

When the anhydrite concentration is insufficient or varies, the product does not have the constancy required for use as a building material or the like.

OBJECTS OF THE INVENTION

It is the principal object of the present invention to provide a building material having a high degree of constancy whereby the disadvantages of earlier systems are obviated.

Another object of this invention is to provide a method of making a building material with improved properties.

Still another object of this invention is to provide an improved method of removing sulfur dioxide and other noxious and toxic components from flue gases and particularly the flue gases of a power plant.

SUMMARY OF THE INVENTION

These objects and others which will become apparent hereinafter are attained, in accordance with the invention, by a method wherein the dry residue recovered in the manner described from the dry particle separator is slurried in water and is supplied as a building material as a slurry.

More particularly, the building material of the invention comprises an aqueous slurry of the reaction product formed by treating flue gases (preferably from a fossil-fuel-fired power plant boiler) with a particulate absorbent of the type described together with the fly ash, which is separated from the flue gases with this reaction product and any unreacted absorbent.

According to another aspect of the invention, the method of removing sulfur dioxide from the flue gas containing the fly ash, sulfur dioxide and other sulfate and noxious components comprises treating the flue gas with an absorbent at last mainly consisting of calcium oxide, calcium hydroxide and/or calcium carbonate in a finely divided dry form to react at least part of the calcium compounds thereof to form calcium sulfate, removing the solids from the flue gas in a dry state to form a residue consisting of the dry solids, namely, the absorbent and the reaction products thereof with the sulfur dioxide and other noxious and toxic components, and fly ash from the flue gas, and slurrying the residue, after separation from the flue gas, in water to form the building material which can be used in place of conventional building gypsum.

According to another aspect of the invention, a building material is formed in the manner described.

The aqueous slurry can be used as a binder in the formation of mortar, concrete or the like together with conventional aggregates, such as sand, slag, cinders and gravel.

The slurry of the invention can be combined with additives, as desired, and used as a filler in compartments of subterranean structures, e.g. to support such structures after a valuable vein has been mined or excavated.

The slurry, however, can also be hardened into shaped bodies such as bricks or blocks, with or without aggregates. The blocks themselves can be comminuted to form aggregates for use with other hydraulic binders or the hydraulic binder formed by the slurry.

The invention provides a simple and economical way of producing structural materials from the residues of the dry absorption desulfurization of flue gases. Calcination of the calcium sulfate, as required to transform the product of wet desulfurization into a useful building material, can be eliminated and thus the energy cost reduced. Indeed, special processes for working up the slurry are not required and the slurry immediately upon formation can be considered useful in the ways described. The hydraulically effective components, namely the anhydrite and the lime, are both effectively used.

SPECIFIC EXAMPLE

This example demonstrates the effectiveness of the process.

To a fuel in the manner described in U.S. Pat. No. 4,262,610, 10% by weight of calcium carbonate is added and a dry flue gas desulfurization is carried out, the solid residue (dry residue) consisting essentially of:

$CaSO_4$: 21.4 weight percent
$CaO$: 42.7 weight percent
$SiO_2$: 27.6 weight percent
$Fe_2O_3$: 2.9 weight percent
$Al_2O_3$: 2.4 weight percent
$MgO$: 1.9 weight percent
Incombustibles: 1.1 weight percent (Similar results are obtained with $CaO$ and $Ca(OH)_2$ as absorbents).

Using the wet desulfurization and the same amount of absorbent, the following product is obtained (dry weight).

$CaSO_4 2H_2O$: 94.4 weight percent
$SiO_2$: 2.1 weight percent
$CaCO_3$: 2.5 weight percent
incombustibles: 1.0 weight percent The dry residue can be slurried with water to form a hardenable product. The product proved to be excellent as a binder with aggregates in the formation of mortar. When cast into blocks the slurried dry residue yielded bricks with a compressive strength over 10 $N/mm^2$.

The wet residue was ineffective alone as a binder.

However, when the dry residue was slurried in the wet residue so that the make-up water for the binder constituted by the dry residue was the excess moisture of the wet residue, the product could be cast into bricks having a compressive strength greater than 10 $N/mm^2$. The bricks were found to be especially effective as building materials.

We claim:

1. A method of desulfurizing a fly ash containing flue gas from a fossil fuel power plant boiler which comprises the steps of:
    introducing a solid finely divided absorbent consisting at least in major part of calcium oxide, calcium hydroxide or calcium carbonate, into said flue gas and maintaining it in contact with said flue gas in a dry absorption stage for a period sufficient to enable the formation of calcium sulfate in a particulate form from said absorbent and as the predominant compound formed from said absorbent;
    dry-separating particulates from said flue gas to recover a solid residue consisting essentially of said absorbent, reaction products thereof, and fly ash;
    slurrying said solid residue in water to form a building material;
    directly using the resulting slurry to form a structure having a determined shape; and
    hardening the structure formed by said slurry.

2. The method defined in claim 1 wherein said solid residue is slurried in water in the form of a wet desulfurization product, further comprising casting the resulting slurry into bricks and hardening the bricks.

3. The method defined in claim 1, further comprising the step of combining the resulting slurry with an aggregate in the formation of a settable building material.

4. The method defined in claim 3 wherein said building material is a mortar.

5. The method defined in claim 3 wherein said building material is a concrete.

6. The method defined in claim 3, further comprising the step of filling said material into subterranean spaces.

7. The method defined in claim 3, further comprising the step of casting said material into blocks.

8. A method of forming a structure in a building process which comprises the steps of:
    (a) controlling the operation of a fossil fuel power plant boiler producing a flue gas containing fly ash and fired with a sulfur-containing fuel and a dry desulfurization of the flue gas which involves the introduction of a solid finely divided absorbent consisting at least in major part of calcium oxide, calcium hydroxide or calcium carbonate into said flue gas and maintaining it in contact with said flue gas in a dry absorption step so that the predominant absorption product is dry calcium sulfate in a particulate form in the resulting flue gas;
    (b) dry-separating particulates from said resulting flue gas to recover a solid residue consisting essentially of said absorbent, said absorption product and fly ash;
    (c) slurrying said solid residue in water to directly form a building material in the form of a slurry; and
    (d) shaping and hardening the resulting slurry directly to produce a structure.

* * * * *